United States Patent
Ukita et al.

(10) Patent No.: US 10,001,798 B2
(45) Date of Patent: Jun. 19, 2018

(54) DETERMINING POWER TO BE SUPPLIED BASED ON RESERVATION INFORMATION OF A VEHICLE

(75) Inventors: Masakazu Ukita, Kanagawa (JP);
Shiho Moriai, Kanagawa (JP);
Masanobu Katagi, Kanagawa (JP)

(73) Assignee: Sony Corporation, Tokyo (JP)

(*) Notice: Subject to any disclaimer, the term of this patent is extended or adjusted under 35 U.S.C. 154(b) by 527 days.

(21) Appl. No.: 14/124,801

(22) PCT Filed: May 25, 2012

(86) PCT No.: PCT/JP2012/063432
§ 371 (c)(1),
(2), (4) Date: Dec. 9, 2013

(87) PCT Pub. No.: WO2013/011739
PCT Pub. Date: Jan. 24, 2013

(65) Prior Publication Data
US 2014/0100708 A1    Apr. 10, 2014

(30) Foreign Application Priority Data

Jul. 21, 2011 (JP) ................. 2011-159725

(51) Int. Cl.
*G05D 3/12* (2006.01)
*G05F 1/66* (2006.01)
(Continued)

(52) U.S. Cl.
CPC .............. *G05F 1/66* (2013.01); *B60L 11/184* (2013.01); *B60L 11/1824* (2013.01);
(Continued)

(58) Field of Classification Search
CPC ... Y02T 10/7005; Y02T 90/14; Y02T 90/128; Y02T 90/163; Y02T 90/169;
(Continued)

(56) References Cited

U.S. PATENT DOCUMENTS

| 4,385,382 A | * | 5/1983 | Goss | ...................... G06F 13/225 |
| | | | | 370/449 |
| 8,013,470 B2 | * | 9/2011 | Votoupal | ................... H02J 3/32 |
| | | | | 307/43 |

(Continued)

FOREIGN PATENT DOCUMENTS

| JP | 2001-008380 | 1/2001 |
| JP | 2001-8380 | 1/2001 |

(Continued)

OTHER PUBLICATIONS

Office Action for JP Patent Application No. 2016-045200, issued on Dec. 13, 2016, 04 pages of Office Action.

(Continued)

*Primary Examiner* — Darrin Dunn
(74) *Attorney, Agent, or Firm* — Chip Law Group

(57) ABSTRACT

There is provided an information processing device including an acquisition unit that acquires power supply request information that includes information on a supply period during which an electric power system is requesting supply of electric power, and reservation information for a vehicle, a calculation unit that, on the basis of the reservation information, calculates supply power to be supplied to the electric power system from the vehicle during the supply period, and a notification unit that notifies the electric power system of the calculated supply power.

7 Claims, 7 Drawing Sheets

(51) Int. Cl.
*H02J 3/32* (2006.01)
*B60L 11/18* (2006.01)
*H02J 3/38* (2006.01)
*H02J 7/00* (2006.01)

(52) U.S. Cl.
CPC ....... *B60L 11/1842* (2013.01); *B60L 11/1844* (2013.01); *B60L 11/1846* (2013.01); *H02J 3/32* (2013.01); *H02J 3/381* (2013.01); *H02J 7/0004* (2013.01); *B60L 2230/16* (2013.01); *B60L 2230/40* (2013.01); *B60L 2240/72* (2013.01); *B60L 2240/80* (2013.01); *Y02E 60/721* (2013.01); *Y02T 10/7005* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/163* (2013.01); *Y02T 90/168* (2013.01); *Y02T 90/169* (2013.01); *Y04S 10/126* (2013.01); *Y04S 30/12* (2013.01); *Y04S 30/14* (2013.01)

(58) Field of Classification Search
CPC ............. Y02T 10/7072; Y02T 10/7088; Y02T 10/7291; Y02T 90/12; Y02T 10/705; Y02T 90/124; Y02T 90/125; Y02T 10/6286; Y02T 10/642
See application file for complete search history.

(56) References Cited

U.S. PATENT DOCUMENTS

| | | | | |
|---|---|---|---|---|
| 8,639,232 | B2* | 1/2014 | Rabii | H04W 52/0261 455/418 |
| 9,043,038 | B2* | 5/2015 | Kempton | B60L 11/1824 180/65.275 |
| 2001/0040443 | A1* | 11/2001 | Suzuki | H02J 7/0047 320/134 |
| 2004/0032264 | A1* | 2/2004 | Schoch | G01R 31/361 324/426 |
| 2004/0073440 | A1* | 4/2004 | Garbers | G06Q 10/02 705/5 |
| 2009/0228225 | A1* | 9/2009 | Burgess | G01R 31/3651 702/63 |
| 2009/0259421 | A1* | 10/2009 | Pop | G01R 31/3648 702/63 |
| 2010/0077075 | A1* | 3/2010 | Cuni | H04W 24/08 709/224 |
| 2010/0121588 | A1* | 5/2010 | Elder | H01M 10/48 702/63 |
| 2010/0145885 | A1* | 6/2010 | Graziano | B60L 11/1816 705/412 |
| 2010/0253142 | A1* | 10/2010 | Votoupal | H02J 3/32 307/31 |
| 2011/0025556 | A1* | 2/2011 | Bridges | B60L 3/12 342/357.25 |
| 2011/0196692 | A1* | 8/2011 | Chavez, Jr. | B60L 11/1824 705/1.1 |
| 2011/0202418 | A1* | 8/2011 | Kempton | B60L 11/1824 705/26.1 |
| 2011/0288891 | A1* | 11/2011 | Zaid | G06Q 10/02 705/4 |
| 2011/0302078 | A1* | 12/2011 | Failing | B60L 3/00 705/39 |
| 2011/0313603 | A1* | 12/2011 | Laberteaux | B60L 11/184 701/22 |
| 2012/0083258 | A1* | 4/2012 | Rabii | H04W 52/0261 455/418 |
| 2013/0162025 | A1* | 6/2013 | Momose | B60L 11/1862 307/9.1 |
| 2013/0179061 | A1* | 7/2013 | Gadh | B60L 11/1842 701/123 |
| 2015/0160672 | A1* | 6/2015 | Hakim | B60L 11/1824 700/291 |

FOREIGN PATENT DOCUMENTS

| | | |
|---|---|---|
| JP | 2001-008380 A | 1/2001 |
| JP | 2002-342878 A | 11/2002 |
| JP | 2007-330083 | 12/2007 |
| JP | 2007-330083 A | 12/2007 |
| JP | 2008-182851 | 8/2008 |
| JP | 2008-182851 A | 8/2008 |
| JP | 2009-183086 | 8/2009 |
| JP | 2010-81722 | 4/2010 |
| JP | 2010-081722 A | 4/2010 |
| JP | 2010-512727 | 4/2010 |
| JP | 2010-512727 A | 4/2010 |
| JP | 2010-231258 A | 10/2010 |
| JP | 2011-509648 | 3/2011 |

OTHER PUBLICATIONS

Office Action for JP Patent Application No. 2016-045200, issued on Feb. 21, 2017, 6 pages of Office Action.

* cited by examiner

DETERMINING POWER TO BE SUPPLIED BASED ON RESERVATION INFORMATION OF A VEHICLE

TECHNICAL FIELD

The present disclosure relates to an information processing device, an information processing method, a program, a recording medium, and an information processing system.

BACKGROUND ART

In recent years, starting with electric vehicles and hybrid cars, vehicles equipped with higher-capacity batteries than conventional gasoline vehicles are beginning to proliferate. These vehicles equipped with higher-capacity batteries emit less carbon dioxide than gasoline vehicles when running, and thus have become a focus of attention as one countermeasure against global warming. Also, there is an emerging movement to utilize electric power charged in such vehicles equipped with higher-capacity batteries as an electric power source. The supply of electric power stored in a vehicle to an electric power system is called vehicle to grid (V2G). Utilizing V2G in time periods of high power usage leads to a cut in peak electricity output.

For example, Patent Literature 1 discloses a power supply system that attempts to provide a stable supply of electric power by preregistering a daily required charging amount for an electric vehicle owned by an individual, and using electric power exceeding the daily required charging amount for V2G according to power supply and demand. Also, Patent Literature 2 discloses a network-controlled charging system that controls electric vehicles via a communication network by using network-controlled electrical outlets (Smartlets).

Meanwhile, however, in recent years an increasing number of people are reserving and renting a vehicle as necessary in order to save vehicle upkeep and management costs. In addition to conventional car rental systems, in recent years car sharing, in which a specific vehicle is used jointly by multiple members, is becoming more prevalent.

CITATION LIST

Patent Literature

Patent Literature 1: JP 2009-183086A
Patent Literature 2: JP 2011-509648A

SUMMARY OF INVENTION

Technical Problem

In light of the above circumstances, it is desirable to supply an electric power system with electric power retained by vehicles that are used by being reserved, such as with car rental and car sharing.

Solution to Problem

According to the present disclosure, there is provided an information processing device including an acquisition unit that acquires power supply request information that includes information on a supply period during which an electric power system is requesting supply of electric power, and reservation information for a vehicle, a calculation unit that, on the basis of the reservation information, calculates supply power to be supplied to the electric power system from the vehicle during the supply period, and a notification unit that notifies the electric power system of the calculated supply power.

According to such a configuration, it is possible, on the basis of reservation information, to calculate and notify an electric power system of supply power that vehicles are able to supply to the electric power system during a requested supply time period. Herein, an electric power system is a concept including devices that manage power supply and demand, such as a power company, a power transfer company, or a power distribution company, for example. The vehicles used herein are vehicles retained by a company that provides a service such as car sharing or car rental, for example, and are vehicles that are used by being reserved.

According to the present disclosure, there is provided an information processing method including acquiring power supply request information that includes information on a supply period during which an electric power system is requesting supply of electric power, and reservation information for a vehicle, calculating, on the basis of the reservation information, supply power to be supplied to the electric power system from the vehicle during the supply period, and notifying the electric power system of the calculated supply power.

According to the present disclosure, there is provided a program for causing a computer to function as an information processing device including an acquisition unit that acquires power supply request information that includes information on a supply period during which an electric power system is requesting supply of electric power, and reservation information for a vehicle, a calculation unit that, on the basis of the reservation information, calculates supply power to be supplied to the electric power system from the vehicle during the supply period, and a notification unit that notifies the electric power system of the calculated supply power.

According to the present disclosure, there is provided a computer-readable recording medium having a program recorded thereon, the program causing a computer to function as an information processing device including an acquisition unit that acquires power supply request information that includes information on a supply period during which an electric power system is requesting supply of electric power, and reservation information for a vehicle, a calculation unit that, on the basis of the reservation information, calculates supply power to be supplied to the electric power system from the vehicle during the supply period, and a notification unit that notifies the electric power system of the calculated supply power.

According to the present disclosure, there is provided an information processing system including an electric power system that transmits power supply request information that requests supply of electric power in a time period during which power demand is predicted to exceed supply, a user device that transmit reservation information for a vehicle, and an information processing device that includes an acquisition unit that acquires the power supply request information as well as the reservation information related to a plurality of the vehicles, a calculation unit that, on the basis of the reservation information, calculates supply power to be supplied to the electric power system from the vehicles during a supply period included in the power supply request information, and a notification unit that notifies the electric power system of the calculated supply power.

Advantageous Effects of Invention

According to the present disclosure as described above, it is possible to supply an electric power system with electric power retained by vehicles that are used by being reserved.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Hereinafter, the description will proceed in the following order.

1. Configuration
1-1. System configuration
1-2. Configuration of vehicle reservation management device
2. Operations
2-1. System operations
2-2. Supply power calculating operations
<1. Configuration>
(1-1. System Configuration)

Figure 1:
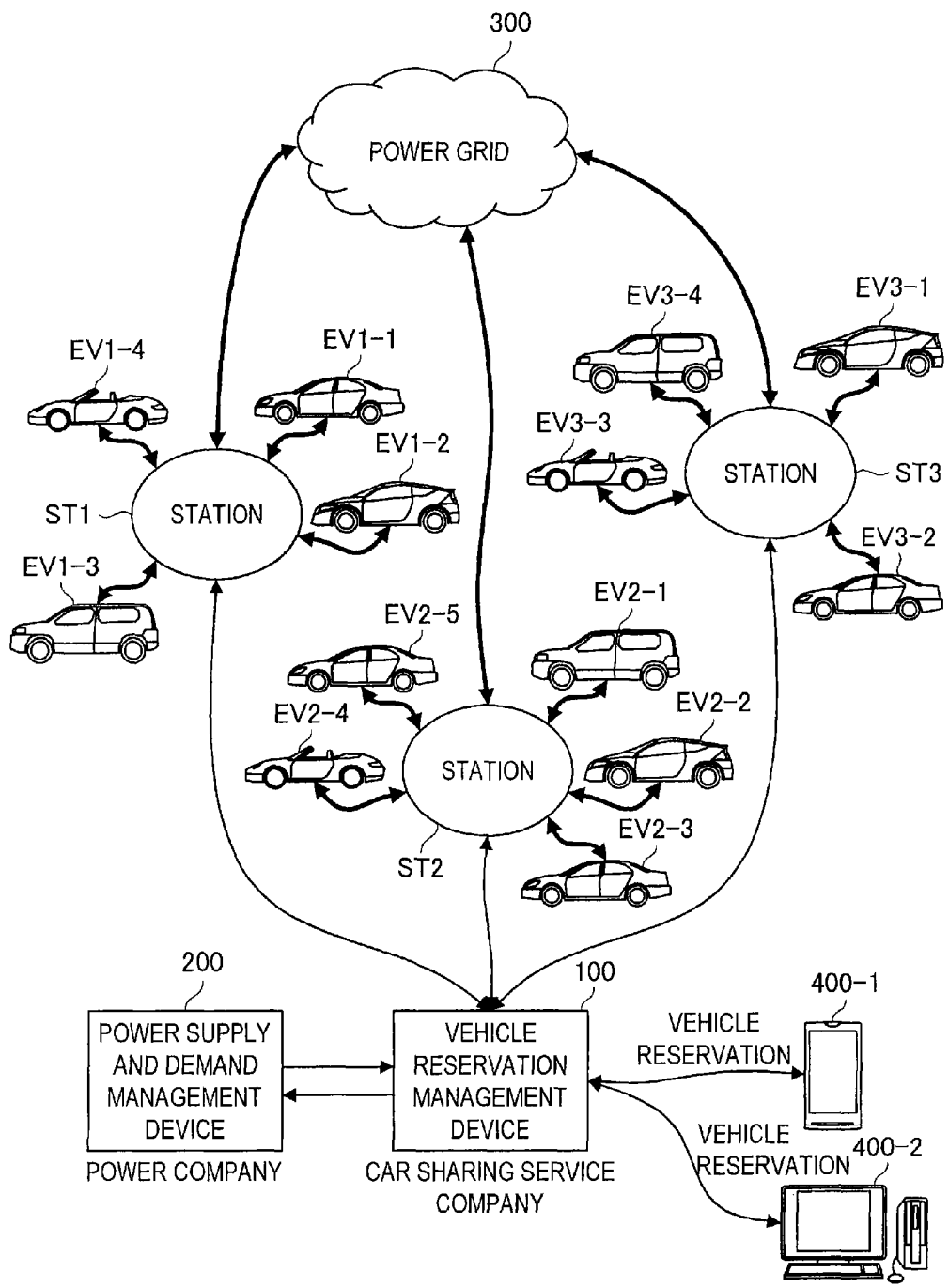
FIG. 1 is a diagrammatic layout of a power supply system according to an embodiment of the present disclosure.

First, a configuration of a power supply system according to an embodiment of the present disclosure will be described with reference to FIG. 1. FIG. 1 is a diagrammatic layout of a power supply system according to an embodiment of the present disclosure.

Note that, in this specification and the drawings, multiple structural elements having substantially the same function and structure may in some cases be distinguished by different numbers appended to the same sign following a hyphen. For example, multiple elements having substantially the same function and structure are distinguished as a user device 400-1, a user device 400-2, and so on as necessary. On the other hand, when it is not particularly necessary to distinguish each of multiple structural elements having substantially the same function and structure, only the sign will be given. For example, when it is not particularly necessary to distinguish a user device 400-1, a user device 400-2, and the like, these will be simply designated the user devices 400.

A power supply system according to the present embodiment primarily includes a vehicle reservation management device 100 of a company that provides a car sharing service, respective stations ST in the car sharing service, multiple electric vehicles EV belonging to a station ST, a power grid 300 that supplies electric power to respective homes, buildings, and the like, a power supply and demand management device 200 that manages the balance of the supply and demand of electric power with respect to the power grid 300, and user devices 400 that reserve a vehicle in order to use the car sharing service.

The car sharing service is a service in which registered members jointly use a specific vehicle. Whereas car rental is often a service anticipating comparatively long-term usage, and is a service that leases vehicles to an unspecified number of users, car sharing is often a service anticipating comparatively short-term usage, and is a service in which specific users registered in advance jointly use a vehicle. Car rental and car sharing are both services in which a vehicle is used by being reserved in advance. Hereinafter, information that includes a target vehicle and usage period under reservation will be referred to as reservation information. Although the present embodiment describes the case of application to a car sharing service, the present technology is not limited to such an example. The present technology may also be applied to car rental.

The vehicle reservation management device 100 is an example of an information processing device that includes a function for managing the reservation of electric vehicles EV retained by a car sharing service company, and a power supply control function for calculating and notifying an electric power system of supply power to supply from electric vehicles EV to the electric power system. Note that although the function for managing the reservation of electric vehicles EV and the power supply control function for controlling power to supply from electric vehicles EV to the electric power system are realized by a single vehicle reservation management device 100 herein, the present technology is not limited to such an example. These functions may also be respectively realized by separate devices.

By conducting V2G, which transfers electric power stored in the batteries of electric vehicles EV retained by a car sharing service company to a power grid 300 (smart grid), and by having electric vehicles EV that were charged at night when electricity rates are low connect to the power grid 300 and supply (sell) electric power during the day, for example, it is possible for the car sharing service company to profit from the price difference in electricity rates. Also, by having the electric power system use electric power supplied from electric vehicles EV, there is the advantage of being able to reduce electricity output during peak demand, and standardize the supply and demand balance. In other words, the batteries of electric vehicles EV are able to assume the role of a buffer between power supply and demand. Particularly, renewable energy, which is the subject of recent attention, has the advantages of being inexhaustible with a low burden on the natural world, there are lingering concerns regarding the stability of supply, and thus the level of attention on buffers between the supply and demand balance is rising. Also, since car sharing services and car rental have already achieved a usage pattern of reservation before use, there is an advantage in that it is easy to acquire information related to vehicle usage for use in calculating supply power.

The power supply and demand management device 200 is a device that includes a function for managing the balance of supply and demand in the electric power system. The power supply and demand management device 200 predicts the power demand, and when the power demand may potentially exceed supply, for example, is able to request the supply of power from a device that includes a function for managing power supply from other than the electric power system, such as the vehicle reservation management device 100, for example. For example, the power supply and demand management device 200 is able to transmit power supply request information that includes information on a time period during which power demand is predicted to exceed supply.

The power grid 300 is the part of the electric power system that supplies electric power to places where electric power is needed, such as respective homes, office buildings, or factories. The power grid 300 is able to supply electric power to respective stations ST. In addition, the power grid 300 is also able to be supplied with power stored in batteries onboard electric vehicles EV from respective stations ST.

The user devices 400 are examples of information processing clients that make car sharing service reservations via a vehicle reservation screen provided by the vehicle reservation management device 100. The user devices 400 are client devices of members registered in the car sharing service. For example, a user device 400 may be a mobile phone, as illustrated as the user device 400-1 in FIG. 1. In addition, a user device 400 may be a personal computer (PC), as illustrated as the user device 400-2 in FIG. 1.

A station ST is a place where electric vehicles EV used in a car sharing service are handed over and charged. A station ST is equipped with charging facilities for charging an electric vehicle EV. Note that although a station ST herein is taken to charge an electric vehicle EV with electric power supplied from the power grid 300, the present technology is not limited to such an example. For example, a station ST may also include home generator facilities, and charge an electric vehicle EV with generated electric power. Note that although three stations ST from a station ST1 to a station ST3 are illustrated in FIG. 1, a power supply system may obviously include even more stations ST. Also, although multiple electric vehicles EV are taken to be respectively parked at each of the stations ST herein, it is also acceptable for just one electric vehicle EV to be parked at a station ST. Also, although the vehicles parked at the stations ST herein are all taken to be electric vehicles EV, the present technology is not limited to such an example. For example, the vehicles parked at a station ST may include various types of vehicles, such as gasoline vehicles and hybrid vehicles. However, in this case, the vehicles for which supply power is calculated are the vehicles that include a comparatively high-capacity battery, such as an electric vehicle EV or hybrid vehicle, and do not include gasoline vehicles.

(1-2. Configuration of Vehicle Reservation Management Device)

Figure 2:
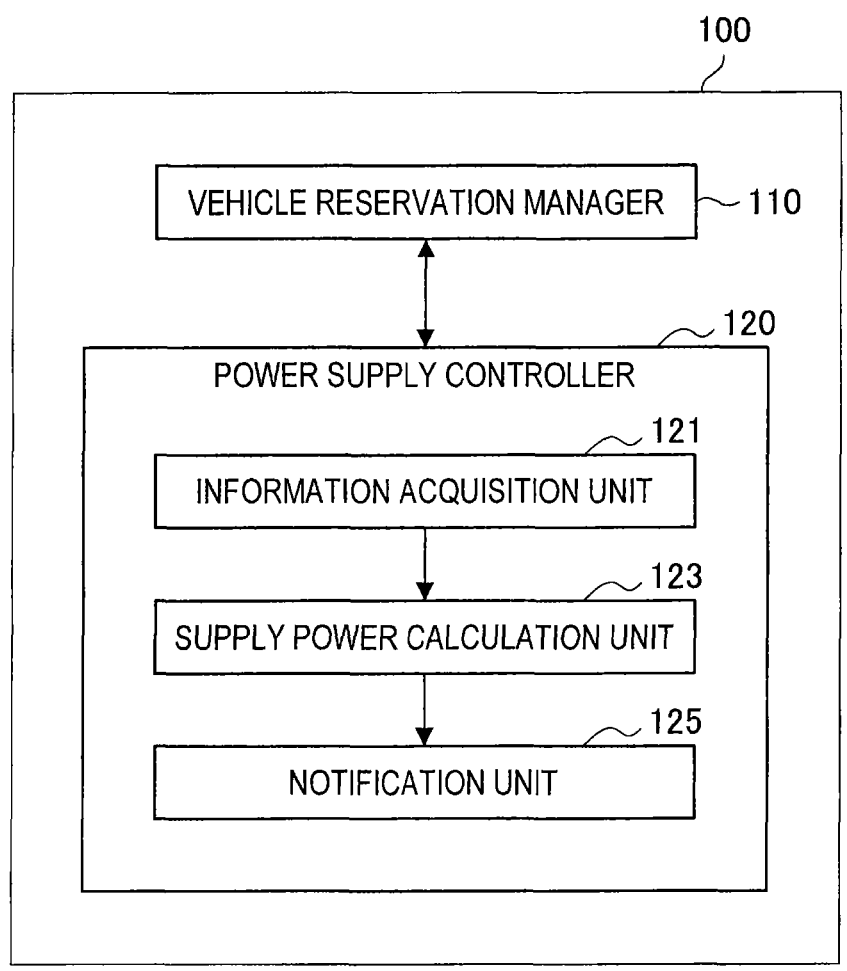
FIG. 2 is a block diagram illustrating a configuration of a vehicle reservation management device according to the same embodiment.

Next, a configuration of a vehicle reservation management device 100 according to an embodiment of the present disclosure will be described with reference to FIG. 2. FIG. 2 is a block diagram illustrating a configuration of a vehicle reservation management device according to the same embodiment.

The vehicle reservation management device 100 primarily includes a vehicle reservation manager 110 and a power supply controller 120. The power supply controller 120 additionally includes the functions of an information acquisition unit 121, a supply power calculation unit 123, and a notification unit 125.

The vehicle reservation manager 110 includes a function for providing a user device 400 with a reservation reception screen that receives a vehicle reservation, and additionally generating vehicle reservation information on the basis of information input via the reservation reception screen. Also, the vehicle reservation manager 110 is able to execute various processes related to vehicle reservation on the basis of generated reservation information.

The power supply controller 120 includes a function for controlling the supply of electric power stored in the batteries of respective electric vehicles EV to an electric power system, according to a request from the electric power system.

The information acquisition unit 121 is an example of an acquisition unit that includes a function for acquiring power supply request information that includes information on a supply period during which the electric power system is requesting the supply of electric power, and vehicle reservation information. Power supply request information is received from the power supply and demand management device 200, for example. In response to receiving power supply request information, the information acquisition unit 121 is able to acquire vehicle reservation information approximately near the above supply period, and input the power supply request information and the vehicle reservation information into the supply power calculation unit 123.

The supply power calculation unit 123 is an example of a calculation unit that, on the basis of vehicle reservation information, calculates supply power that may be supplied to the electric power system during a requested supply period. The supply power calculation unit 123 is able to select, from among the vehicles retained by the car sharing service company, target vehicles for power supply from a vehicle equipped with a comparatively high-capacity battery, and by totaling the maximum power that each of the selected vehicles is able to supply during the supply period, is able to calculate supply power that may be supplied by the car sharing service company as a whole. At this point, the supply power calculation unit 123 is able to select vehicles that are not reserved during the supply period as target vehicles. In addition, in order to accommodate sudden reservations, the supply power calculation unit 123 may also exclude from the target vehicles one or some (but not all) vehicles per station, or alternatively, a number of vehicles predicted from information such as past usage/reservation records and weather information or the like, for example.

Note that the supply power calculation unit 123 is able to calculate supply power such that the amount of power to be consumed by reservations scheduled after the supply period will be charged in the batteries of reserved vehicles by the time the reservation starts. In other words, the supply power calculation unit is able to calculate electric power to supply from vehicles such that, between the time when the supply period ends and the time when a reservation starts, a vehicle will be charged up to an amount of charge that will be used due to vehicle usage according to a reservation scheduled after the supply period. Note that the details of supply power calculation by the supply power calculation unit 123 will be further discussed later.

The notification unit 125 includes a function for notifying the electric power system of supply power calculated by the supply power calculation unit 123. When the supply power calculation unit 123 calculates electric power to supply to the electric power system, the notification unit 125 is able to notify the power supply and demand management device 200 of the value of the calculated supply power. In addition, the notification unit 125 is also able to notify each station ST of values of electric power to be supplied by respective vehicles.

Examples of the function of the vehicle reservation management device 100 according to the embodiment of the present disclosure have hitherto been described. The above-described respective constituent elements may be configured using general units or circuits or may be configured by hardware specialized for the functions of the respective constituent elements. Further, the functions of the respective constituent elements may be performed by reading a control program, which describes a processing order in which the functions are realized by an arithmetic device such as a central processing unit (CPU), from a storage medium such as a read-only memory (ROM) or a random access memory (RAM), which stores the control program, analyzing the control program, and executing the control program. Accordingly, a configuration to be appropriately used may be modified in accordance with a technical level at which this embodiment is realized.

A computer program configured to realize the functions of the vehicle reservation management device 100 according to the above-described embodiment may be created and mounted on a personal computer or the like. Further, a computer readable recording medium that stores the computer program may be provided. Examples of the recording medium include a magnetic disk, an optical disc, a magneto-optical disc, and a flash memory. Furthermore, the computer program may be delivered via a network or the like without use of a recording medium.

<2. Operations>
(2-1. System Operations)

Figure 3:
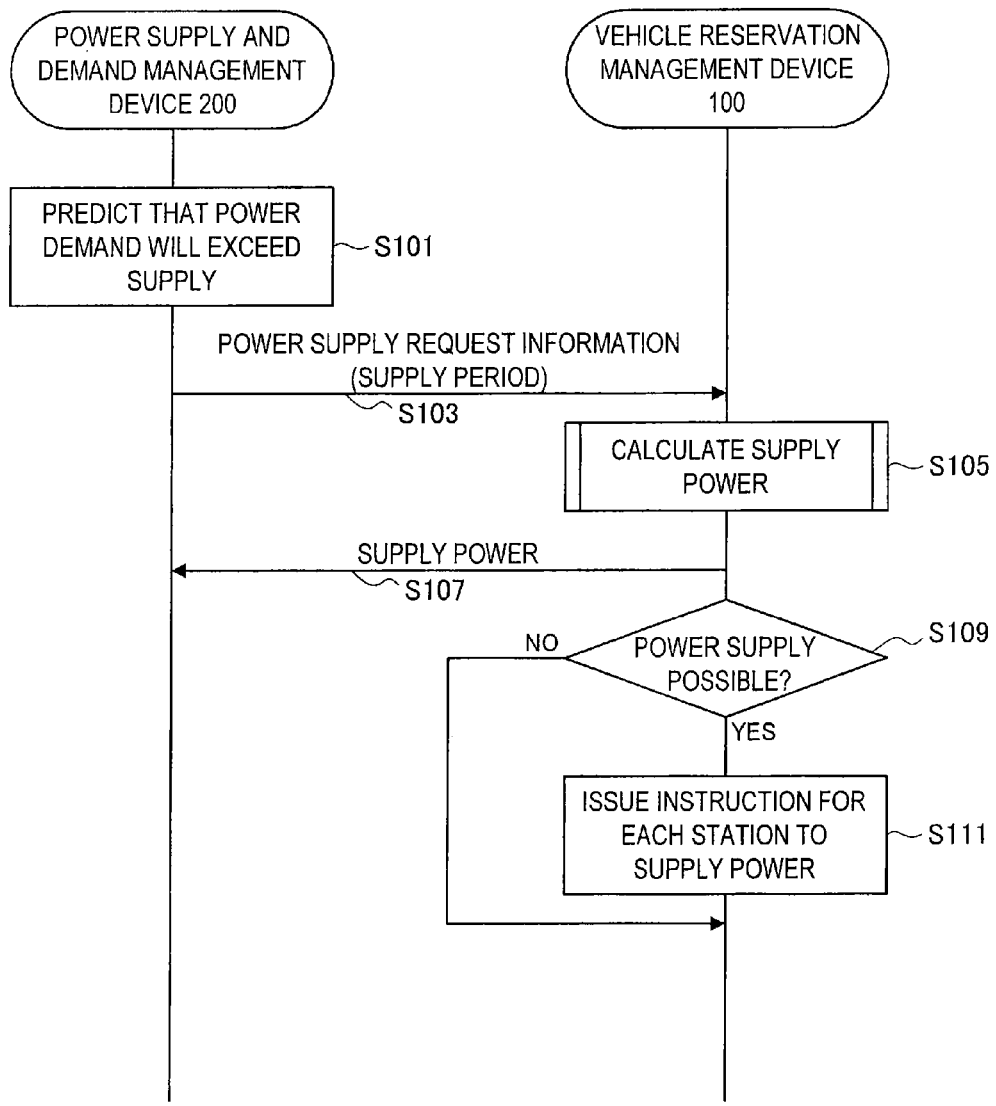
FIG. 3 is a sequence diagram illustrating operations of a power supply system according to the same embodiment.

First, an example of operations of a power supply system according to an embodiment of the present disclosure will be described with reference to FIG. 3. FIG. 3 is a sequence diagram illustrating operations of a power supply system according to the same embodiment.

First, the power supply and demand management device 200 predicts that power demand will exceed supply (S101). The power supply and demand management device 200 then transmits, to the vehicle reservation management device 100, power supply request information that includes information on a supply period during which the supply of electric power is requested (S103). The vehicle reservation management device 100 then calculates supply power that may be supplied to the electric power system during the requested time period (S105). The power calculated at this point may be the maximum value available after providing a buffer necessary to maintain the service.

When supply power is calculated, the vehicle reservation management device 100 is able to transmit the calculated supply power to the power supply and demand management device 200 (S107). Subsequently, the vehicle reservation management device 100 determines whether or not power supply is possible on the basis of the supply power calculated in step S105 (S109), and may issue an instruction for each station to supply power in the case where power supply is possible (S111). At this point, in step S111 the vehicle reservation management device 100 may issue instructions such that respective electric vehicles EV connected to each station supply power calculated by the supply power calculation unit 123 during the supply period.

Note that, herein, information on a supply period is included in the power supply request information, and the vehicle reservation management device 100 notifies the power supply and demand management device 200 of a value of power that may be supplied during the supply period. However, the present technology is not limited to such an example. For example, the power supply and demand management device 200 may also transmit to the vehicle reservation management device 100 power supply request information that includes a power value requested for supply. At this point, the vehicle reservation management device 100 may supply power to the electric power system when it is possible to supply the requested power value, for example. In addition, the power supply and demand management device 200 may also determine, on the basis of supply power received from the vehicle reservation management device 100, whether or not to receive power supply from vehicles managed by the vehicle reservation management device 100, and transmit to the vehicle reservation management device 100 a request for power supply, or a notification indicating that power supply is not needed.

(2-2. Supply Power Calculating Operations)

Figure 4:
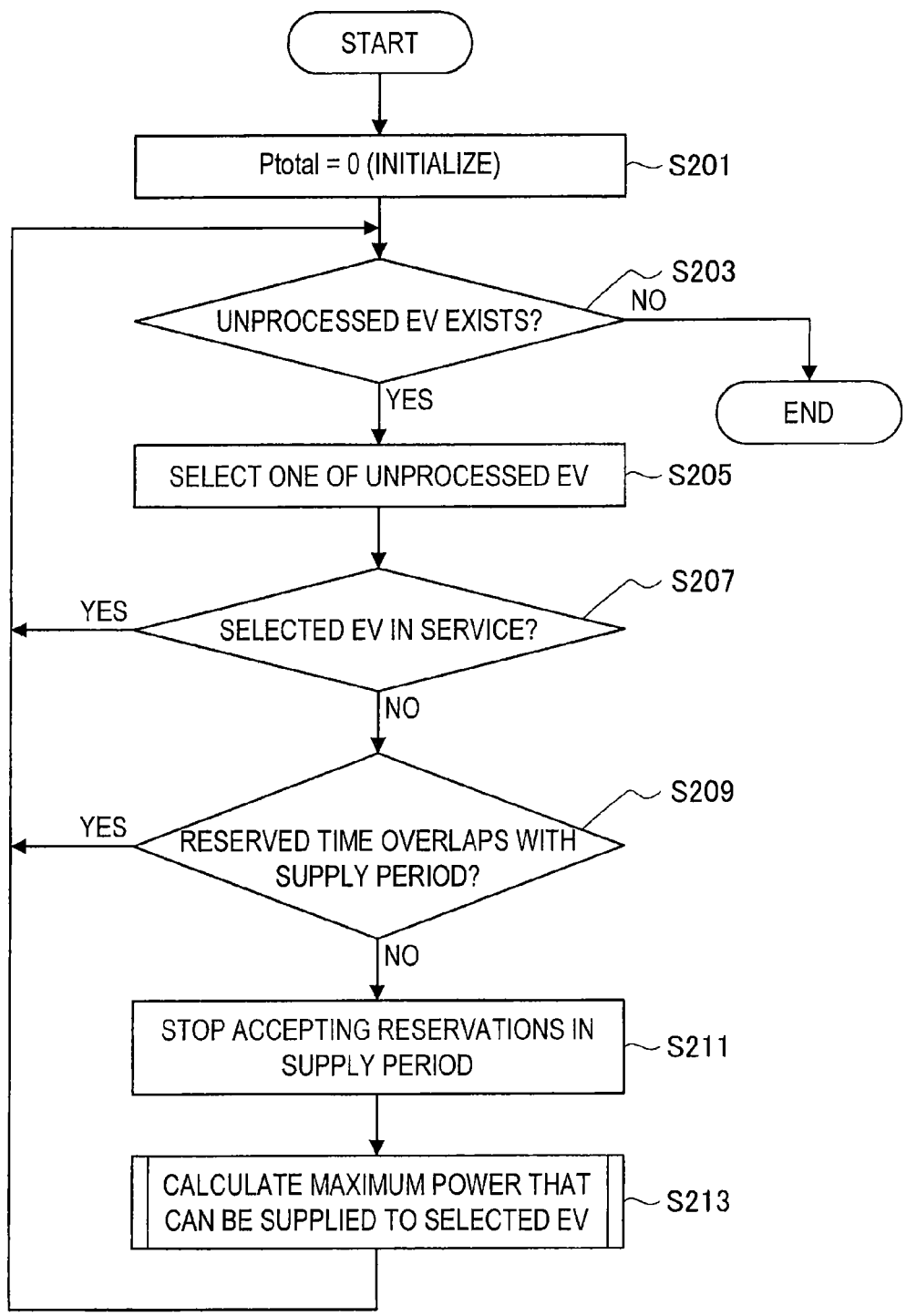
FIG. 4 is a flowchart illustrating operations of a supply power calculating process by a vehicle reservation management device according to the same embodiment.
Figure 5:
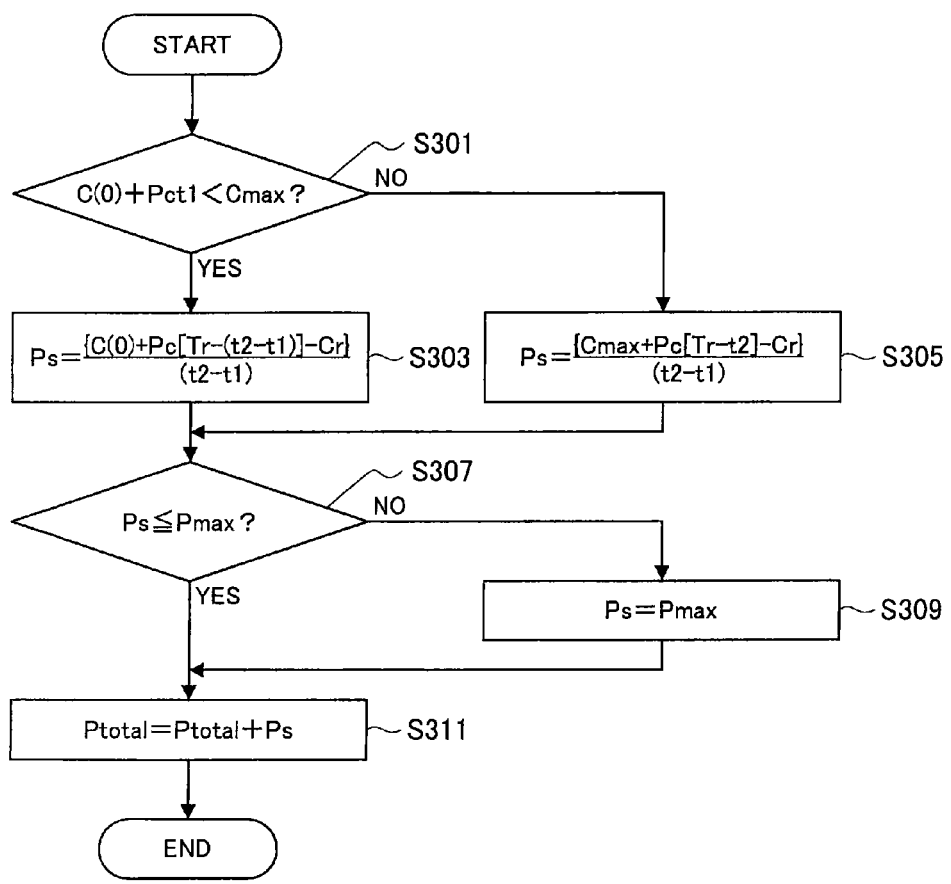
FIG. 5 is a flowchart illustrating operations of a calculating process that calculates a maximum power that one selected vehicle is able to supply, by a vehicle reservation management device according to the same embodiment.
Figure 6:
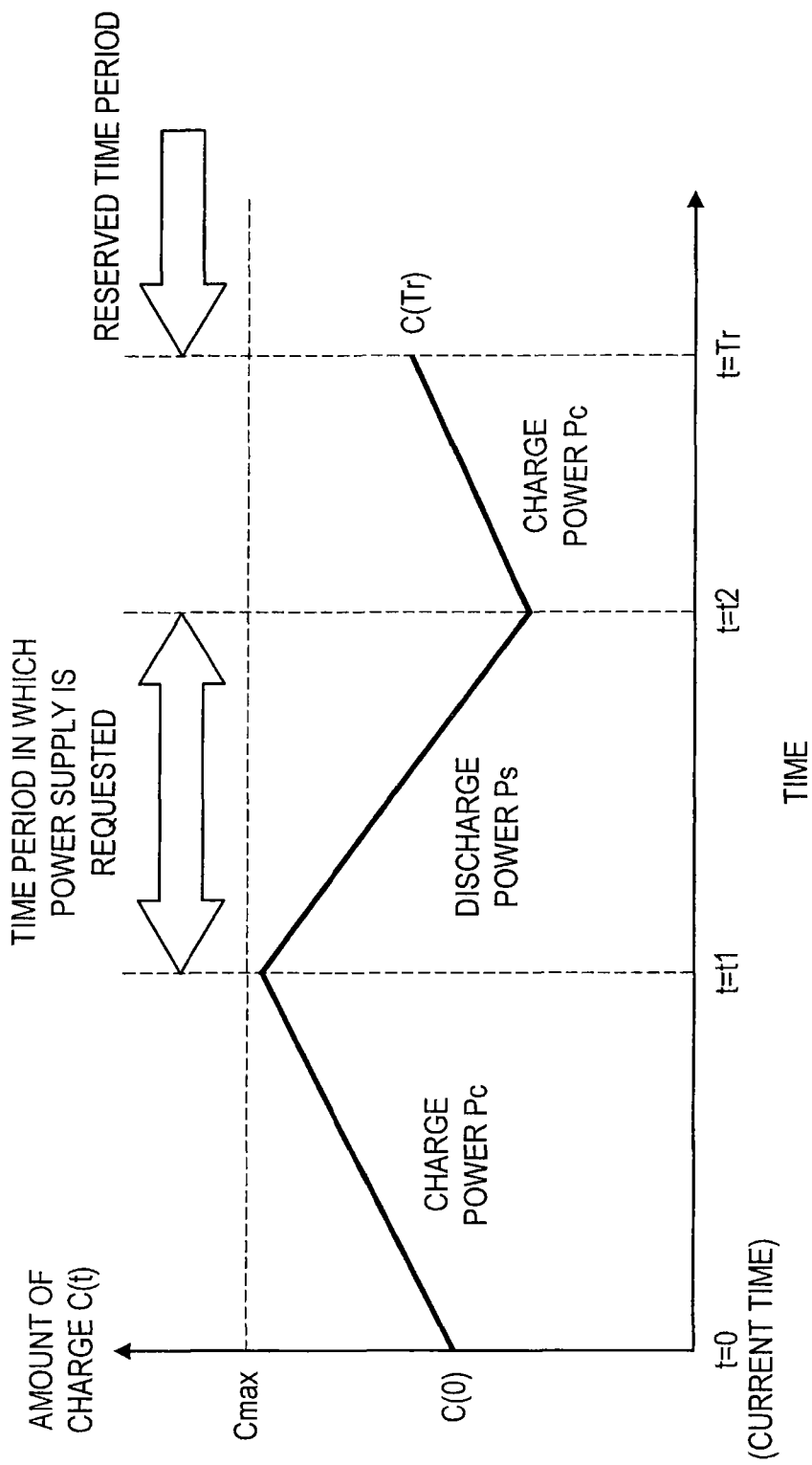
FIG. 6 is an explanatory diagram for explaining a supply power calculating process by a vehicle reservation management device according to the same embodiment.
Figure 7:
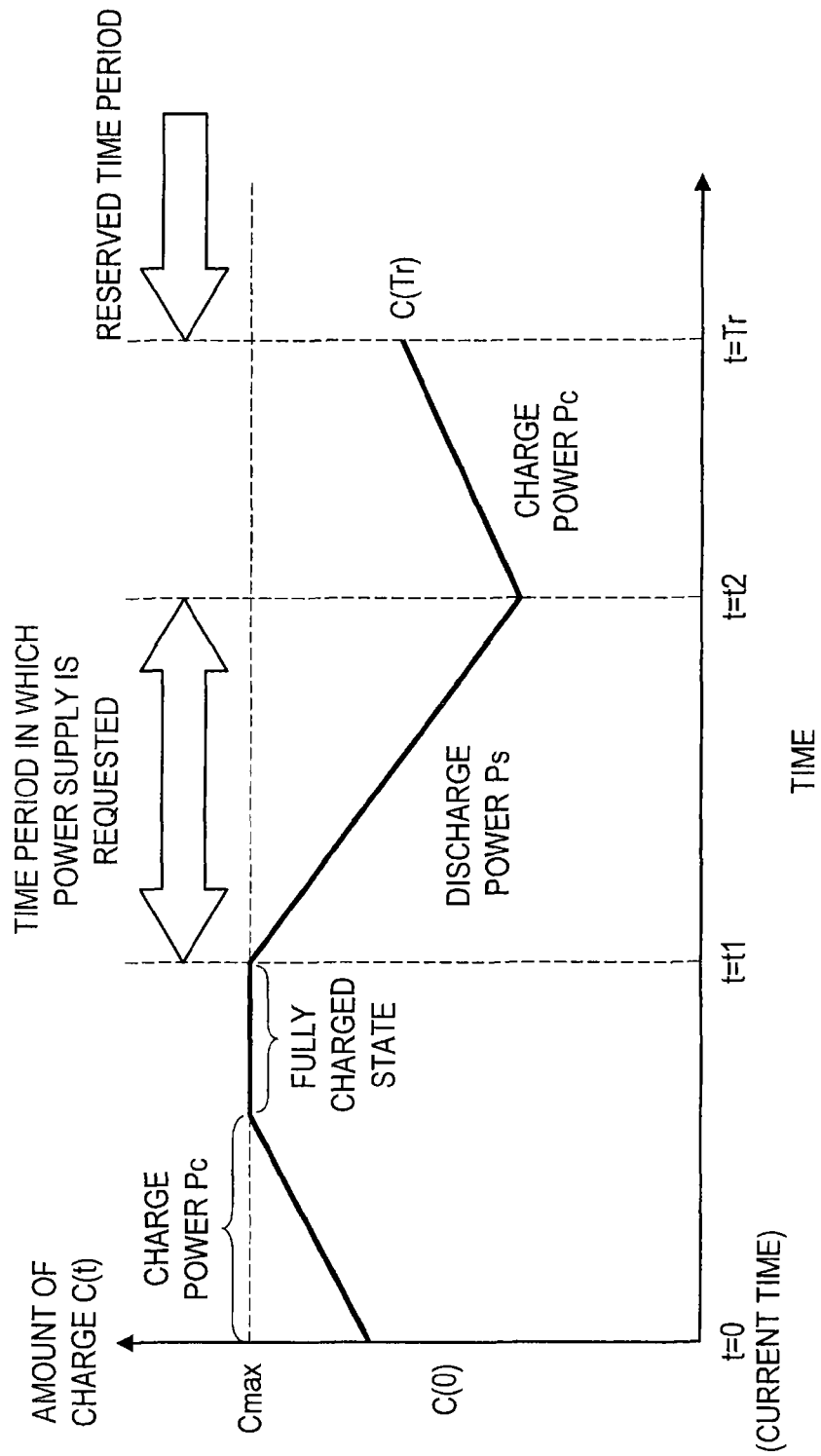
FIG. 7 is an explanatory diagram for explaining a supply power calculating process for the case of reaching a full charge by the time supply starts, by a vehicle reservation management device according to the same embodiment.

Next, supply power calculating operations will be described with reference to FIGS. 4 to 7. Note that the supply power calculating operations described herein illustrate the details of step S105 in FIG. 3. FIG. 4 is a flowchart illustrating operations of a supply power calculating process by a vehicle reservation management device according to the same embodiment. FIG. 5 is a flowchart illustrating operations of a calculating process that calculates a maximum power that one selected vehicle is able to supply, by a vehicle reservation management device according to the same embodiment. FIG. 6 is an explanatory diagram for explaining a supply power calculating process by a vehicle reservation management device according to the same embodiment. FIG. 7 is an explanatory diagram for explaining a supply power calculating process for the case of reaching a full charge by the time supply starts, by a vehicle reservation management device according to the same embodiment.

First, referring to FIG. 4, the supply power calculation unit 123 first initializes a value of Ptotal by setting the value to 0 (S201). This Ptotal is the total amount of power that vehicles retained by the car sharing service company may supply to the electric power system. Next, the supply power calculation unit 123 determines whether or not an unprocessed electric vehicle EV exists (S203). At this point, if it is determined that an unprocessed electric vehicle EV does not exist, the process ends.

Meanwhile, upon determining in step S203 that an unprocessed electric vehicle EV does exist, the supply power calculation unit 123 selects one of the unprocessed electric vehicles EV as a vehicle to process (S205). Subsequently, it is determined whether or not the selected electric vehicle EV is in service (S207). At this point, the question of being in service or not may be determined on the basis of whether or not the electric vehicle EV is parked at a station, for example. Then, in the case where the selected electric vehicle EV is in service, the electric vehicle EV is ineligible for power supply, and thus the process returns again to step S203. On the other hand, in the case where the selected electric vehicle EV is not in service, the supply power calculation unit 123 next determines whether or not a reserved time of the selected electric vehicle EV overlaps with the supply period during which the supply of electric power is requested (S209). At this point, in the case where a reserved time of the selected electric vehicle EV overlaps with the supply period, that electric vehicle EV is likewise ineligible for power supply, and the process returns again to step S203.

On the other hand, in the case of determining in step S209 that a reserved time does not overlap with the supply period, the supply power calculation unit 123 acquires that electric vehicle EV as a vehicle eligible for power supply, and stops accepting reservations during the supply period (S211). Subsequently, the supply power calculation unit 123 calculates the maximum power that can be supplied to the selected electric vehicle EV (S213). Herein, the details of step S213 will be discussed later with reference to FIG. 5. Upon calculating the electric power that the selected electric vehicle EV is able to supply to the electric power system, the supply power calculation unit 123 returns again to the processing in step S203. Subsequently, such operations are repeated until an unprocessed electric vehicle EV no longer exists in step S203.

At this point, details of the process for calculating the electric power to be supplied by one selected electric vehicle EV will be described with reference to FIGS. 5 to 7. The supply power calculation unit 123 first determines whether or not the battery of a target electric vehicle EV will reach a fully charged state by the time the supply period starts (S301). Herein, take C(t) to be the amount of charge at time t, and take t=0 to be the time when the supply power is calculated. Also, take Pc to be the charge power, t1 to be the time when the supply period starts, and Cmax to be the amount of charge in the fully charged state. Then, at the current time, the supply power calculation unit 123 calculates the sum of a first amount of power C(0) charged in a multi-selected electric vehicle EV, and the product Pct1 of the charge power Pc and the length of time t1 to charge, and determines whether or not "C(0)+Pct1" exceeds the amount of charge Cmax in the fully charged state (that is, the charge capacity). Herein, an example of "C(0)+Pct1" not exceeding the charge capacity Cmax is illustrated in FIG. 6, while an example of "C(0)+Pct1" exceeding the charge capacity Cmax is illustrated in FIG. 7. Herein, the charge capacity Cmax may be the value of the maximum possible charge, or be preset to a value smaller than the maximum value in order to potentially increase the battery lifespan.

Next, the supply power calculation unit 123 calculates a maximum value of a discharge power Ps for that electric vehicle EV to supply power during the supply period. The supply power calculation unit 123 may calculate the discharge power Ps such that, between a time t2 when the supply period ends and a reservation start time Tr, the battery of the electric vehicle EV is charged to an amount of charge needed for use in the reservation of the electric vehicle EV. Herein, the formula for calculating a discharge power Ps differs depending on whether or not the above "C(0)+Pct1" exceeds the charge capacity Cmax (in other words, whether or not a fully charged state will be reached by the supply period start time t1).

The supply power calculation unit 123 may calculate a discharge power Ps by adding together a first amount of power C(0) charged in the battery at the current time (t=0), a second amount of power charged from the current time (t=0) up to the supply period start time t1, and a third amount of power charged from the supply period end time t2 to the reservation start time Tr, subtracting from this value a fourth amount of power Cr to be used due to vehicle usage according to a reservation, and then converting the resulting value into a value per unit time.

At this point, the value of the second amount of power is Pct1 in the case where "C(0)+Pct1" does not exceed the charge capacity Cmax, or in other words, in the case where a fully charged state will not be reached by the time t1. However, in the case where "C(0)+Pct1" exceeds the charge capacity Cmax, or in other words, in the case where a fully charged state will not be reached by the time t1, the value of the second amount of power becomes a value smaller than Pct1. In this case, the sum of the first amount of power and the second amount of power becomes Cmax. The discharge power Ps is the value obtained by dividing the value of the sum of the first power, second power, and third power, minus the fourth power, by the length of time of the supply period (t2−t1).

Consequently, the discharge power Ps calculated at this point is expressed by the following Eq. 1 in the case where "C(0)+Pct1" does not exceed the charge capacity Cmax, or in other words, in the case where a fully charged state will not be reached by the time t1 (S303).

$$Ps = \frac{\{C(0) + Pc[Tr - (t2 - t1)] - Cr\}}{(t2 - t1)} \quad \text{(Eq. 1)}$$

Meanwhile, the discharge power Ps calculated at this point is expressed by the following Eq. 2 in the case where "C(0)+Pct1" exceeds the charge capacity Cmax, or in other words, in the case where a fully charged state will be reached by the time t1 (S305).

$$Ps = \frac{\{Cmax + Pc[Tr - t2] - Cr\}}{(t2 - t1)} \quad \text{(Eq. 2)}$$

Note that the fourth amount of power Cr is the amount of power needed for use according to a reservation, and may be estimated from factors such as a travel time and travel distance set for the reservation, and road conditions and weather forecasted during the reservation. Obviously, the value of Cr differs for each electric vehicle EV.

Next, the supply power calculation unit 123 determines whether or not the calculated discharge power Ps exceeds a specification value Pmax for the maximum discharge power of the battery (S307). A maximum value for the power that may be discharged from a battery is determined by specification. Consequently, in the case where the discharge power Ps calculated in step S303 or step S305 exceeds Pmax, the discharge power Ps is set to the maximum discharge power Pmax according to specification. Subsequently, the supply power calculation unit 123 adds the discharge power Ps that may be supplied by the electric vehicle EV being processed at this point to supply power Ptotal (S311).

The foregoing thus describes one or more preferred embodiments of the present disclosure in detail and with reference to the attached drawings. However, the technical scope of the present disclosure is not limited to such examples. It is clear to persons ordinarily skilled in the technical field of the present disclosure that various modifications or alterations may occur insofar as they are within the scope of the technical ideas stated in the claims, and it is to be understood that such modifications or alterations obviously belong to the technical scope of the present disclosure.

For example, in the foregoing embodiment, although vehicle reservation is prioritized, the present technology is not limited to such an example. For example, in some cases a power supply request may be prioritized, even after considering the cost of paying a cancellation fee to members who had made reservations, or the reduction in future profit due to a worse reputation because of cancellations. In this case, the vehicle reservation management device 100 may conduct a reservation cancelling process on the basis of power supply request information, and add cancelled electric vehicles EV to the vehicles to be used for power supply. At this point, it is desirable for the vehicle reservation management device 100 to cancel reservations in order of the electric vehicles EV with the cheapest costs associated with cancelling a reservation.

Also, although the foregoing embodiment describes a request for power supply over one supply period from t1 to t2, the present technology is not limited to such an example. By conducting a similar process on multiple time periods, it is also possible to respond to a power supply request for multiple time periods.

In the present disclosure, the steps that are described in the flowcharts and the sequence diagrams include the processing that is executed in time series according to the order described in the present disclosure and the processing that is not executed in the time series but executed in parallel or individually. In the steps that are executed in the time series, the order may be appropriately changed as necessary.

The present technology may also be configured as below.

(1)

An information processing device including:

an acquisition unit that acquires power supply request information that includes information on a supply period during which an electric power system is requesting supply of electric power, and reservation information for a vehicle;

a calculation unit that, on the basis of the reservation information, calculates supply power to be supplied to the electric power system from the vehicle during the supply period; and a notification unit that notifies the electric power system of the calculated supply power.

(2)

The information processing device according to (1), wherein the calculation unit calculates the supply power by totaling power to be supplied by each of the vehicle that is not reserved during the supply period.

(3)

The information processing device according to (1) or (2), wherein the calculation unit calculates power to be supplied by each of the vehicle in a manner that, between a time when the supply period ends and a time when the reservation starts, an amount of charge that is used for usage of the vehicle according to the reservation is charged.

(4)

The information processing device according to any one of (1) to (3), wherein the calculation unit calculates power to be supplied by each of the vehicle by adding together a first amount of power charged in the battery at a current time, a second amount of power charged from a current time up to a start time of the supply period, and a third amount of power charged from an end time of the supply period up to a start time of the reservation, subtracting from the added value a fourth amount of power to be used for usage of the vehicle according to the reservation, and converting the subtracted value into a value per unit time.

(5)

The information processing device according to (4), wherein when a sum of a product of a length of time from the current time to the start time of the supply period and a charge power, and the first amount of power, exceeds a charge capacity, the calculation unit calculates the supply power by taking a sum of the first amount of power and the second amount of power as a value of the charge capacity.

(6)

The information processing device according to (5), wherein when the sum of the product of the length of time from the current time to the start time of the supply period and the charge power, and the first amount of power, does not exceed the charge capacity, the calculation unit calculates the supply power by taking the product of the length of time from the current time to the start time of the supply period and the charge power as the second amount of power.

(7)

An information processing method including:

acquiring power supply request information that includes information on a supply period during which an electric power system is requesting supply of electric power, and reservation information for a vehicle;

calculating, on the basis of the reservation information, supply power to be supplied to the electric power system from the vehicle during the supply period; and notifying the electric power system of the calculated supply power.

(8)

A program for causing a computer to function as an information processing device including an acquisition unit that acquires power supply request information that includes information on a supply period during which an electric power system is requesting supply of electric power, and reservation information for a vehicle, a calculation unit that, on the basis of the reservation information, calculates supply power to be supplied to the electric power system from the vehicle during the supply period, and a notification unit that notifies the electric power system of the calculated supply power.

(9)

A computer-readable recording medium having a program recorded thereon, the program causing a computer to function as an information processing device including an acquisition unit that acquires power supply request information that includes information on a supply period during which an electric power system is requesting supply of electric power, and reservation information for a vehicle, a calculation unit that, on the basis of the reservation information, calculates supply power to be supplied to the electric power system from the vehicle during the supply period, and a notification unit that notifies the electric power system of the calculated supply power.

(10)

An information processing system including:

an electric power system that transmits power supply request information that requests supply of electric power in a time period during which power demand is predicted to exceed supply;

a user device that transmit reservation information for a vehicle; and an information processing device that includes an acquisition unit that acquires the power supply request information as well as the reservation information related to a plurality of the vehicles, a calculation unit that, on the basis of the reservation information, calculates supply power to be supplied to the electric power system from the vehicles during a supply period included in the power supply request information, and a notification unit that notifies the electric power system of the calculated supply power.

REFERENCE SIGNS LIST 100 vehicle reservation management device (information processing device)
110 vehicle reservation manager
120 power supply controller
121 information acquisition unit (acquisition unit)
123 supply power calculation unit (calculation unit)
125 notification unit
200 power supply and demand management device (electric power system)
300 power grid (electric power system)
400 user device
ST station
EV electric vehicle (vehicle)

The invention claimed is:

1. An information processing device, comprising
a central processing unit (CPU) configured to:
acquire power supply request information that includes information on a supply period during which an electric power system requests supply of electric power, wherein the power supply request information is acquired from the electric power system;
acquire reservation information of a first vehicle;
calculate a first electric power to be supplied to the electric power system from the first vehicle during the supply period, wherein the first electric power is calculated based on the reservation information of the first vehicle;
calculate a corresponding electric power supplied by each of a plurality of vehicles based on
calculation of an added value based on addition of
a first amount of electric power stored in a battery at a current time, wherein the current time corresponds to a first time instance at which the corresponding electric power supplied by each of the plurality of vehicles is calculated,
a second amount of electric power charged in the battery from the current time to a start time, wherein the start time corresponds to a second time instance at which the supply period starts, and
a third amount of electric power charged from an end time of the supply period to a start time of a reservation of the first vehicle, and
subtraction of, from the added value, a fourth amount of electric power that is utilized for usage of the first vehicle based on the reservation information;
determine that a sum of a product of a time duration from the current time to the start time of the supply period and the first amount of electric power, and the second amount of electric power exceeds a maximum charge capacity of the battery;
calculate the first electric power based on the maximum charge capacity of the battery that is smaller than the determined sum;
notify the electric power system of the calculated first electric power; and
control a second electric power supplied to the electric power system based on the calculated first electric power.

2. The information processing device according to claim 1, wherein
the CPU is further configured to calculate the first electric power based on summation of the corresponding electric power to be supplied by each of the plurality of vehicles that is unreserved during the supply period.

3. The information processing device according to claim 1, wherein
the CPU is further configured to calculate the corresponding electric power to be supplied by each of the plurality of vehicles such that, between a time duration from the end time of the supply period to the start time of the reservation of the first vehicle, the battery is charged by an amount of charge required by the first vehicle based on the reservation information.

4. The information processing device according to claim 1, wherein
based on a determination that the sum of the product of the time duration from the current time to the start time of the supply period and the first amount of electric power, and the second amount of electric power is less than the maximum charge capacity of the battery,
the CPU is further configured to calculate the first electric power based on the product of the time duration from the current time to the start time of the supply period and the first amount of electric power, and the second amount of electric power.

5. An information processing method, comprising:
acquiring power supply request information that includes information on a supply period during which an electric power system is requesting supply of electric power and reservation information of a first vehicle, wherein the power supply request information is acquired from the electric power system;
calculating a first electric power to be supplied to the electric power system from the first vehicle during the supply period, wherein the first electric power is calculated based on the reservation information of the first vehicle;
calculating a corresponding electric power, wherein the corresponding electric power is supplied by each of a plurality of vehicles, wherein the corresponding electric power is calculated based on
calculation of an added value based on addition of
a first amount of electric power stored in a battery at a current time, wherein the current time corresponds to a first time instance at which the corresponding electric power supplied by each of the plurality of vehicles is calculated,
a second amount of electric power charged in the battery from the current time to a start time, wherein the start time corresponds to a second time instance at which the supply period starts, and
a third amount of electric power charged from an end time of the supply period to a start time of a reservation of the first vehicle, and
subtraction of, from the added value, a fourth amount of electric power that is utilized for usage of the first vehicle based on the reservation information;
determining that a sum of a product of a time duration from the current time to the start time of the supply period and the first amount of electric power, and the second amount of electric power exceeds a maximum charge capacity of the battery;
calculating the first electric power based on the maximum charge capacity of the battery that is smaller than the determined sum;

notifying the electric power system of the calculated first electric power; and controlling a second electric power supplied to the electric power system based on the calculated first electric power.

6. A non-transitory computer-readable medium having stored thereon, computer-executable instructions for causing a computer to execute operations, the operations comprising:

acquiring power supply request information that includes information on a supply period during which an electric power system is requesting supply of electric power and reservation information of a first vehicle, wherein the power supply request information is acquired from the electric power system;

calculating a first electric power to be supplied to the electric power system from the first vehicle during the supply period, wherein the first electric power is calculated based on the reservation information of the first vehicle;

calculating a corresponding electric power, wherein the corresponding electric power is supplied by each of a plurality of vehicles, wherein the corresponding electric power is calculated based on calculation of an added value based on addition of:
    a first amount of electric power stored in a battery at a current time, wherein the current time corresponds to a first time instance at which the corresponding electric power supplied by each of the plurality of vehicles is calculated,
    a second amount of electric power charged in the battery from the current time to a start time, wherein the start time corresponds to a second time instance at which the supply period starts, and
    a third amount of electric power charged from an end time of the supply period to a start time of a reservation of the first vehicle, and subtraction of, from the added value, a fourth amount of electric power that is utilized for usage of the first vehicle based on the reservation information;

determining that a sum of a product of a time duration from the current time to the start time of the supply period and the first amount of electric power, and the second amount of electric power exceeds a maximum charge capacity of the battery;

calculating the first electric power based on the maximum charge capacity of the battery that is smaller than the determined sum;

notifying the electric power system of the calculated first electric power; and controlling a second electric power supplied to the electric power system based on the calculated first electric power.

7. An information processing system, comprising:

an electric power system configured to transmit power supply request information to request supply of electric power in a supply period during which power demand is predicted to exceed supply, wherein the power supply request information comprises the supply period;

a user device configured to transmit reservation information of a first vehicle; and an information processing device that includes a central processing unit (CPU) configured to:

acquire the power supply request information from the electric power system and the reservation information of the first vehicle;

calculate a first electric power to be supplied to the electric power system from the first vehicle during the supply period, wherein the first electric power is calculated based on the reservation information of the first vehicle;

calculate a corresponding electric power, wherein the corresponding electric power is supplied by each of a plurality of vehicles, wherein the corresponding electric power is calculated based on calculation of an added value based on addition of:
    a first amount of electric power stored in a battery at a current time, wherein the current time corresponds to a first time instance at which the corresponding electric power supplied by each of the plurality of vehicles is calculated,
    a second amount of electric power charged in the battery from the current time to a start time, wherein the start time corresponds to a second time instance at which the supply period starts, and
    a third amount of electric power charged from an end time of the supply period to a start time of a reservation of the first vehicle, and subtraction of, from the added value, a fourth amount of electric power that is utilized for usage of the first vehicle based on the reservation information;

determine that a sum of a product of a time duration from the current time to the start time of the supply period and the first amount of electric power, and the second amount of electric power that exceeds a maximum charge capacity of the battery;

calculate the first electric power based on the maximum charge capacity of the battery that is smaller than the determined sum;

notify the electric power system of the calculated first electric power; and control a second electric power supplied to the electric power system based on the calculated first electric power.

* * * * *